United States Patent Office 3,270,044
Patented August 30, 1966

3,270,044
PROCESS FOR THE MANUFACTURE OF GAMMA-KETOCARBOXYLIC ACID NITRILES
Karl Schmitt, Herne, Westphalia, Josef Disteldorf, Wanne-Eickel, Werner Hubel, Herne, Westphalia, and Klaus Rindtorff, Recklinghausen, Germany, assignors to Hibernia-Chemie Gesellschaft mit beschrankter Haftung, Gelsenkirchen-Buer, Germany, a corporation of Germany
No Drawing. Filed Oct. 4, 1962, Ser. No. 228,514
Claims priority, application Germany, Oct. 9, 1961,
H 43,837
6 Claims. (Cl. 260—464)

This invention relates to the manufacture of gamma-ketocarboxylic acid nitriles. It is particularly concerned with the production of gamma-ketocarboxylic acid nitriles from alpha, beta-unsaturated ketones.

Several methods of producing dihydroisophoronecarboxylic acid nitrile are known to the art. For example, one known process for producing dihydroisophoronecarboxylic acid nitrile from isophorone and hydrocyanic acid involves a two-stage reaction, in the first stage of which isophorone is contacted with sodium cyanide, methanol, and water and thereafter, in a second stage, acetic acid is introduced in drop-wise fashion releasing hydrocyanic acid. The reaction mixture is permitted to stand at room temperature for several days and the nitrile recovered. The nitrile despite the long reaction time is obtained in a relatively low yield. This procedure, producing only insignificant amounts of nitrile, cannot be considered an industrially feasible process.

Still another process for the production of the nitriles involves carrying out the conversion to nitrile at a substantially higher temperature range, i.e. of between about 125 and 275° C. and preferably between 150 and 225° C. This process is carried out by first preparing the entire amount of the ketone to be converted. The ketone prepared additionally contains considerable amounts of solvent, such as dimethylacetamide, as well as the alkaline catalyst used, such as, for example potassium carbonate. During the reaction it is necessary to keep the hydrocyanic acid concentration very low, and this is achieved by adding the hydrocyanic acid to the previously prepared mixture drop-wise, controlling the rate so that, as the hydrocyanic acid is dripped in, a reaction takes place immediately. This process also requires relatively long reaction times, and the yields again are not sufficiently high to fulfill the requirements for an economically feasible process.

The process of the invention is to be distinguished from all of the aforesaid known processes.

In its broadest aspect, the process of the invention comprises contacting an alpha, beta unsaturated ketone and hydrocyanic acid with an alkaline catalyst supported on carrier materials, the hydrocyanic acid not exceeding 10 weight percent of the feed to the reaction. Under certain circumstances, it is advantageous to dilute the hydrocyanic acid with an inert gas such as nitrogen and the like.

The temperature range at which the reaction of the present invention is carried out is relatively broad and may be any temperature in the range of between about 50 and 350° C. The pressure at which the reaction is carried out can be varied, the process can be carried out at about atmospheric pressure, or also at slightly above or below atmospheric pressure. The optimum conditions can easily be determined in each individual case.

The contact time employed in the process is not especially critical and will vary, of course, depending upon the ketone being treated, the temperature and pressure, etc.

The catalysts used in accordance with the invention are the conventional alkaline catalysts and of these the alkali hydroxides or alkali cyanides, such as for example potassium hydroxide or potassium cyanide or the like are preferably used. However, any other suitable catalyst can be used in the instant process, including, for example, alkaline earth compounds, alkali and alkaline earth alcoholates, oxides, peroxides, and the like. The essential factor is that the catalyst be used supported on a solid carrier. Any suitable carrier material may be used, such as for example clay bodies, gamma-aluminum oxide, silicates, such as diatomaceous earth, bentonites, montmorillonites etc, or other carrier materials which are inert to the catalytic agents and as well to the cyanides. Ion exchange resins, etc. have also been found to constitute suitable carrier materials for the catalyst. The catalyst carrier material can before using additionally be activated in known manner by acid treatment.

If the catalyst used is insoluble or only slightly soluble there exists the possibility of bringing together the catalyst and the carrier material by precipitation of the soluble charging products. So for example a slowly hardening mass can be obtained by bringing together aqueous solutions of sodium silicate, barium hydroxide and hydrocyanic acid. From this mass very active catalyst grains can be obtained by granulation, pelletizing etc., the surface area of these grains being favourable for carrying out the process of the invention (e.g. 80 square meters per gram and more; however, in this connection it is to be noted that the process can be carried out with good results with catalyst carriers of substantially lower surface areas, the latter being not critical for the practicability of the invention).

The reactants for the process of the invention are any alpha, beta-unsaturated ketone as for example isophorone, and mesityloxide as well as 2-methylcyclopentenylmethylketone, 2-ethylcyclohexenylbenzylketone, 2-butylcyclohexenylphenylketone, etc. as well as hydrocyanic acid.

A substantial advantage of the process of the invention lies in the fact that the use of solvents is not necessary. Similarly, the need for agitation of the reaction mixture is eliminated.

It has been found in accordance with the invention, with respect to the addition of hydrocyanic acid to the double bond of alpha, beta-unsaturated ketones that the concentration of the cyanide ion is the determining factor as regards the speed of reaction as is the case with the addition of hydrocyanic acid to carbonyl groups. This means that the free or excess hydrocyanic acid has no influence on the kinetics of the reaction. Instead, the presence of the free hydrocyanic acid tends to favor the formation of undesirable by-products, i.e., side-reactions and especially those which form by self-polymerization. It is, therefore, important to the carrying out of the reaction that the highest possible percentage of cyanide ions be present in the reaction mixture. Under the conditions of the reaction, only a limited quantity of hydrocyanic acid is taken up, that is dissolved in the liquid present in the reaction, while the greater quantity, according to the amount fed in, is in the form of vapor. Only the dissolved portion can enter into an addition reaction. Consequently, on the basis of this knowledge, the importance of the catalyst on a solid support, with its resulting large surface area, becomes apparent. If the mixture of ketone and hydrocyanic acid is passed through a solid-support catalyst in such a manner that the entire volume of the liquid phase flows downwardly over the catalyst, while it is true that a part of the hydrocyanic acid will pass into the vapor state, the hydrocyanic acid that remains in solution is, however, able to react very rapidly in the thin film form with the ketone on the large surface area of the catalyst. Because of the high rate of conversion of the hydrocyanic acid in the liquid phase, the gaseous hydrocyanic acid can then dissolve in the liquid and be available again for entering into the reaction. The difference in the flow velocity of the liquid phase on the one hand and of the gaseous phase on the other is also important in this connection. Whereas the liquid phase has a relatively slow flow rate which varies according to the feed charged, the viscosity thereof and the surface area, the gas flow through the reaction chamber is at a relatively high speed. In this manner, a physical dilution of the hydrocyanic acid takes place with extremely brief periods during which the hydrocyanic acid is in the vapor phase, resulting particularly in a great suppression of side reactions, and in particular of polymerization. This effect is further intensified by the fact that a chemical conversion of the hydrocyanic acid is taking place. During the flow of the gas phase through the catalyst, the concentration of free HCN in the gas phase is very rapidly reduced by the successive conversion, so that side reactions can practically no longer take place. The discharged gas contains only very low HCN concentrations. Indeed, it is an essential requirement of the process of the invention that the HCN content of the starting feed not exceed a certain amount and specifically not exceed 10% of the feed charged. If the conditions of the reaction are appropriately selected, it is easily possible in accordance with the invention to achieve yields of more than 95% for both starting raw materials, with a ketone conversion of up to 30% and a hydrocyanic acid conversion of about 98%.

The invention is illustrated by the following examples of certain preferred embodiments, although it will be understood that the examples are illustrative and not intended to limit the scope of the invention unless otherwise specifically indicated.

*Example 1*

The clay bodies used as catalyst were prepared as follows:

A paste was formed from the clay bodies and a solution containing 100 g. NaCN and 20 g. NaOH in 300 ml. water. The mixture was then evaporated until half of the water had been evaporated off and the catalyst separated from the remaining solution by suction filtering. The recovered catalyst was then dried for 4 hours at 200° C.

A mixture of isophorone and hydrocyanic acid (5.7 weight percent HCN=2.37 mol percent) is passed through an electrically heated glass furnace having a length of 650 mm. and a diameter of 40 mm. filled with 200 grams of clay bodies impregnated with cyanide lye. A gentle current on $N_2$(1.5 l./h.) is simultaneously introduced into and through the reactor.

With a throughput of 50 ml./h., the yellow reaction product recovered still contains 0.18% hydrocyanic acid. 1000 grams of the aforesaid reaction product were subjected to fractional distillation.

The products of this reaction, as determined by the fractional distillation are as follows:

| | G. |
|---|---|
| (1) B.P.$_{19}$—99–100° C. | 640 |
| (2) B.P.$_{19}$—101–148° C. | 12 |
| (3) B.P.$_{19}$—149–151° C. | 333 |
| Distillation residue | 15 |

Stoichiometric evaluation showed a yield of 95.3% ketonitrole with reference to the hydrocyanic acid and 96.0% with reference to the transformed isophorone.

*Example 2*

300 grams of gamma-aluminum oxide pellets impregnated with cyanide lye were used to fill an electrically heated V$_2$A shaft furnace. At 220° C. and 3.5 atmospheres over-pressure, a mixture of isophorone and hydrocyanic acid (5.6 weight percent HCN=23.2 mol percent) was pumped through the furnace at a rate of 100 ml./h. and simultaneously 2 liters of nitrogen per hour were passed through the furnace. The hydrocyanic acid content of the reaction mixture came to 0.1%.

800 grams of the product were subjected to fractionation. The reaction product recovered had the following composition:

| | G. |
|---|---|
| (1) B.P.$_{16}$—95–96° C. | 519 |
| (2) B.P.$_{16}$—96–146° C. | 10 |
| (3) B.P.$_{16}$—146–148° C. | 257 |
| Distillation residue | 13 |

The yield of useful products was 93.4% with reference to the hydrocyanic acid and 95.2% with reference to the isophorone.

*Example 3*

A mixture of isophorone and hydrocyanic acid (28.3 mol percent=7.2 weight percent HCN) was passed through a furnace as described in Example 2 filled with clay bodies impregnated with soda lye and which had been prepared as described in conjunction with the catalyst used in Example 1 at a temperature of 200° C. and at a pressure of 3.8 atmospheres over pressure, and at a throughput rate of 75 ml./h. At the same time 8 to 10 liters of nitrogen per hour were passed through the apparatus to dilute the hydrocyanic acid present in the gaseous phase.

The dark colored reaction product recovered contained 0.42% hydrocyanic acid. The fractional distillation of 800 grams of product yielded the following:

| | G. |
|---|---|
| (1) B.P.$_{19}$—92–102° C. | 451 |
| (2) B.P.$_{19}$—103–148° C. | 8 |
| (3) B.P.$_{19}$—149–151° C. | 325 |
| Distillation residue | 14 |

The yield of useful products was 92.1% with reference to hydrocyanic acid and 95.8% with reference to the converted isophorone.

*Example 4*

A mixture of mesityl oxide and hydrocyanic acid (8.35 weight percent=24.8 mol percent hydrocyanic acid) was passed through the glass furnace described in Example 1 at 100° C. The hydrocyanic acid content in the recovered product averaged 4.01%. After treatment of the reaction product for removal of the untreated hydrocyanic acid, 800 grams of the product were fractionated yielding the following:

| | G. |
|---|---|
| (1) B.P.$_{33}$—46–48° C. | 579 |
| (2) B.P.$_{33}$—48–143° C. | 16 |
| (3) B.P.$_{33}$—144–145° C. | 154 |
| Distillation residue | 48 |

The yield with reference to the hydrocyanic acid converted amounted to 94.3% and with reference to the mesityl oxide converted to 76.3%.

We claim:

1. Process for the manufacture of γ-keto carboxylic acid nitriles comprising the step of contacting a mixture of an α-β-unsaturated ketone selected from the group consisting of isophorone, mesityl oxide, 2-methyl-cyclopentenyl - methyl - ketone, 2 - ethyl-cyclo-hexenyl-benzyl-ketone and 2-butyl-cyclo-hexenyl-phenyl-ketone, and hydrocyanic acid, with an alkaline catalyst selected from the group consisting of alkali metal hydroxides, alkaline earth metal hydroxides, alkali metal cyanides, alkaline earth metal cyanides, alkali metal oxides, alkaline earth metal oxides, alkali metal alcoholates derived from alkanols having from 1–4 carbon atoms, alkaline earth metal alcoholates derived from alkanols having from 1–4 carbon atoms, alkali metal peroxides, alkaline earth metal peroxides, and alkali metal carbonates supported on a solid carrier selected from the group consisting of clay bodies, γ-aluminum oxide and silica, said mixture having a hydrocyanic acid content of from approximately 5 wt. percent and not exceeding approximately 10 wt. percent of the total mixture at a temperature of between 50 and 350° C.

2. Process according to claim 1, wherein said mixture is diluted with an inert gas.

3. Process according to claim 2, wherein said inert gas is nitrogen.

4. Process according to claim 1, wherein said catalyst is an alkali metal cyanide supported on clay bodies as carrier.

5. Process according to claim 1, wherein said catalyst is soda lye supported on clay bodies as carrier.

6. Process according to claim 1, wherein said catalyst is an alkali metal cyanide supported on gamma-aluminum oxide.

References Cited by the Examiner
UNITED STATES PATENTS 2,166,600   7/1939   Leupold et al. _____ 260—465.1

FOREIGN PATENTS 628,075   9/1961   Canada.

CHARLES B. PARKER, *Primary Examiner.*

JOSEPH P. BRUST, *Assistant Examiner.*